Oct. 6, 1925.
A. W. JOHNSON ET AL
1,556,147
CHORD INDICATOR FOR MUSICAL INSTRUMENTS
Filed April 30, 1924
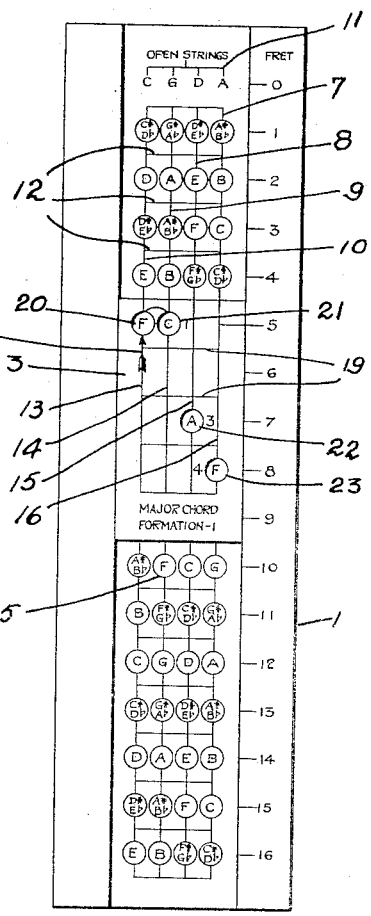
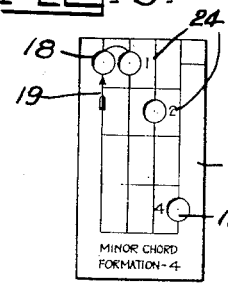
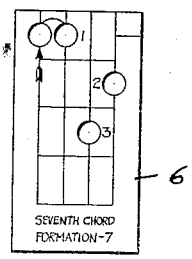
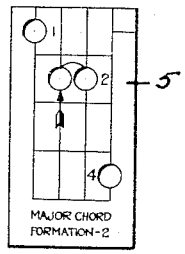
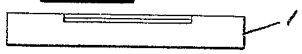
INVENTORS
ALLAN W. JOHNSON
HARRY MEEKER Jr.
BY
Greenbown + Reges
ATTORNEYS Patented Oct. 6, 1925.

1,556,147

UNITED STATES PATENT OFFICE.

ALLAN W. JOHNSON, OF BLOOMFIELD, AND HARRY MEEKER, JR., OF NEWARK, NEW JERSEY.

CHORD INDICATOR FOR MUSICAL INSTRUMENTS.

Application filed April 30, 1924. Serial No. 709,961.

*To all whom it may concern:*

Be it known that we, ALLAN W. JOHNSON, a citizen of the United States, and a resident of Bloomfield, in the county of Essex and State of New Jersey, and HARRY MEEKER, Jr., a citizen of the United States, and a resident of Newark, in the county of Essex and State of New Jersey, have invented a new and useful Improvement in Chord Indicators for Musical Instruments, of which the following is a specification.

This invention relates to a chord indicator for musical instruments, and more particularly for stringed instruments.

One of the objects of this invention is to provide a simple and practical device for indicating the notes comprising the various musical chords.

Another object is to provide a chord indicator which will indicate the location of the notes of the chord, on the strings of the instrument.

Another object is to provide an indicator which will denote the correct finger positions employed in producing the chords.

Another object is to facilitate the teaching of music.

Other objects and advantages will hereinafter appear.

While this invention will be described as applied to the indication of the chords for a tenor banjo and the teaching of the proper manner of playing such chords, it is not so limited and may be applied to other stringed instruments, among which may be mentioned the guitar, ukulele and mandolin, and it may also be used for indicating the notes of the various chords irrespective of the instrument on which they are to be produced.

One embodiment of this invention as applied to a tenor banjo, comprises a slideway simulating the finger board of the instrument having indicated thereon, the strings of the instrument with the notes which may be played on such strings represented in the position in which the fingers would be placed in playing the notes.

A number of slides or templets are adapted to be interchangeably placed in the slideway, each slide representing a different group of chords. One slide for instance, will suffice to indicate all the major chords for a certain formation or finger arrangement, and another slide will indicate all of the minor chords for a definite formation, as will hereinafter more fully appear.

Each slide is perforated in such manner that when placed with a particular perforation registering with a definite note, on the slideway, as for instance "F", the other perforations will register with the notes of the "F" major or minor chord depending on the particular slide being used.

In addition to the major and minor chords, there may be slides for various other chords, as an augmented, diminished or seventh chord, or for the melody or three finger chords.

Each perforation of the slide has a number associated therewith for indicating the finger with which the particular note appearing beneath such perforation should be played.

In order that this invention may be more fully understood, reference will be had to the accompanying drawing, in which:

Fig. 1 is a plan of a chord indicator showing a slide in position;

Fig. 2 is an end elevation of the indicator;

Figs. 3, 4 and 5 represent different slides which may be used for indicating various kinds of chords.

The chord indicator shown in Fig. 1 comprises a base 1 having a slideway for the reception of the various slides 3, 4 and 5 and 6.

This slideway may take various forms but preferably comprises a rectangular groove or channel of the same width as the slide.

The different strings of the instrument are represented in the slideway by the lines 7, 8, 9 and 10, and are designated by their names C, G, D and A as shown at 11. The frets of the instrument are indicated by the transverse lines 12 and between each fret is marked a character representing the note which will be produced when the finger is placed in a corresponding position on the string of the instrument.

Figs. 1, 3, 4 and 5 show some of the slides which may be placed in the slideway to indicate various chords.

Each of these slides comprises a rectangular blank of sufficient length to cover four contiguous notes on any one string and has lines 13, 14, 15 and 16 adapted to align with the lines 7, 8, 9 and 10 respectively, of the slideway and form continuations thereof when the slide is placed therein. The slides are also provided with transverse lines 19 corresponding to the lines 12 of the slideway and between certain of the lines 17 are perforations 18 adapted to register with the characters on the slideway to indicate the notes comprising a particular chord.

An arrow 19 is shown associated with one of the perforations of each slide which may for convenience, be called the index perforation. The note appearing through this perforation together with the legend on the slide designates the chord being indicated in whatever position the slide may be placed in the slideway.

If, for instance, it is desired to play an "F" major chord, the slide 3, designated "Major chord formation 1", may be inserted in the slideway and the index perforation 20 brought into register with the note "F". The remaining notes of the "F" major chord will then be shown through the perforations 21, 22 and 23, namely "C", "A" and "F".

If it is desired to play an "E" major chord, the slide may be moved upward one space to bring the index perforation into registry with note "E" and the notes of this chord will likewise be shown through the perforations.

Similarly any other major chord may be indicated by moving the slide 3 to the proper position in the slideway to bring the index perforation into registry with the desired note.

The minor chords, a seventh or diminished or any other chord may also be indicated by utilizing the proper slide.

Adjacent each perforation, in the slide are numerals, shown at 24 for denoting the finger with which the particular note is to be played. In the case of two notes appearing adjacent a single numeral, both notes are to be played with the same finger.

It is not always desirable to play a particular chord, with the notes arranged in the same order in the scale as shown in Fig. 1 there being three arrangements or formations of the notes for each major or minor chord.

This may best be illustrated by reference to the slide 5 marked "Major chord, formation 2". If this slide were placed in the slideway with its index perforation registering with the note "F", shown at 25, the same notes of the "F" major chord indicated by slide 3 in Fig. 1, namely "F", "C" and "A" would appear beneath the perforations of slide 5. They would, however, be arranged in different order.

If a student of music were playing an "F" major chord in the position of the slide in Fig. 1 and desired to follow it with a "C" major chord, it would not be convenient to shift his hand to either the position marked "0" or "12" on the right of the slideway, to play this chord as would be necessary if he were to play it in formation 1. He could, however, play the "C" major chord in the same approximate position as the "F" major chord by using a different formation. This chord, and the position for playing it may be indicated by the "Major chord, formation 2" slide with its index perforation placed in registry with note "C", in the position marked 5 on the right of the slideway.

It is, of course, understood that any chord or series of chords may be played in either a higher or lower register than that shown, without affecting the harmony, the object being to progress from one chord to another with as little shifting of the hand along the fingerboard, as possible.

It will be noted, therefore, that the student of music desiring to learn a particular chord may by proper adjustment of this device, obtain a clear, accurate indication of the notes of the chord, their exact position on the strings and the correct fingers for reproducing the same, whereby mastery of the chords will be greatly facilitated. He may also, by use of the proper slides, determine the best position along the string to play a particular chord or series of chords.

The described and illustrated arrangement of slides and slideway and the marking thereon, while preferable and particularly advantageous, may nevertheless, be varied without departing from this invention and the invention may be embodied in different forms and applied to other instruments.

What is claimed is:

1. A chord indicator for stringed instruments comprising a pair of relatively movable members, one of said members simulating the finger board of the instrument and the other having a plurality of apertures for cooperating therewith to only expose the notes of a chord.

2. A chord indicator for stringed instruments comprising a pair of relatively movable members, one of said members simulating the finger board of the instrument and the other being slidably attached and having perforations for cooperating with said first member to indicate the notes of a chord when in a given position and the correct finger positions for producing such chords on the instrument.

3. A chord indicator for stringed instruments comprising a slideway simulating the finger board of the instrument and a plurality of interchangeable slides, each slide having differently arranged perforations adapted to cooperate with the slideway to expose the notes of the various chords.

4. A chord indicator for string instruments comprising a base member having characters thereon representing the strings on a finger board, grooves in said base at opposite sides of said characters, a slide movable in said grooves, said slide having perforations to expose characters to indicate a chord.

5. A chord indicator comprising a member having the notes of the scale marked thereon and a second member adapted to be movably associated with said first member for indicating the notes of a chord when the movable member is in a given position, said second member also indicating the correct fingers for producing the chords on a stringed instrument.

6. A chord indicator for string instruments comprising a base member having characters thereon representing the strings on a finger board, grooves in said base at opposite sides of said characters, a plurality of slides adapted for application to said base for movement therealong, each slide having a plurality of perforations in a different arrangement from the perforations of other slides to indicate notes of different musical chords.

7. A chord indicator for musical instruments comprising a member having musical characters thereon, a templet having perforations not less in number than the fingers used in playing a chord and adjustable with respect to said member, said characters being so arranged upon said members as to make visible characters indicating a given chord when one of said perforations makes visible a predetermined character.

8. A chord indicator for musical instruments comprising a member having musical characters thereon, a member movable with respect to said first member, having perforations at least equal to the number of fingers used in playing a chord adapted to register with the characters of said first member and indexing means for properly locating said movable member with respect to said first member for indicating the notes of the desired chords.

9. An indicator for musical chords comprising a slideway having musical characters thereon, a plurality of members adapted for individual application to and movable in said slideway, said members having perforations sufficient in number to expose musical characters indicative of a chord.

10. An indicator for musical chords comprising a slideway having musical characters thereon, and a perforated slide adapted to be moved therein for indicating the notes comprising a desired chord, each of said slides having not less than two perforations arranged to expose musical characters to indicate a chord.

11. An indicator for musical chords comprising a pair of relatively movable members, one of which has musical characters thereon and the other of which is perforated to render visible musical characters when one member is moved to a predetermined position with respect to the other member, to designate not less than two notes comprising a particular chord.

In testimony whereof we have hereunto subscribed our names this 29th day of April, 1924.

ALLAN W. JOHNSON.
HARRY MEEKER, Jr.